April 13, 1965 C. E. HENDERSHOT 3,177,853
INTERNAL COMBUSTION ENGINE ARRANGEMENT
Filed Dec. 28, 1961 4 Sheets-Sheet 1
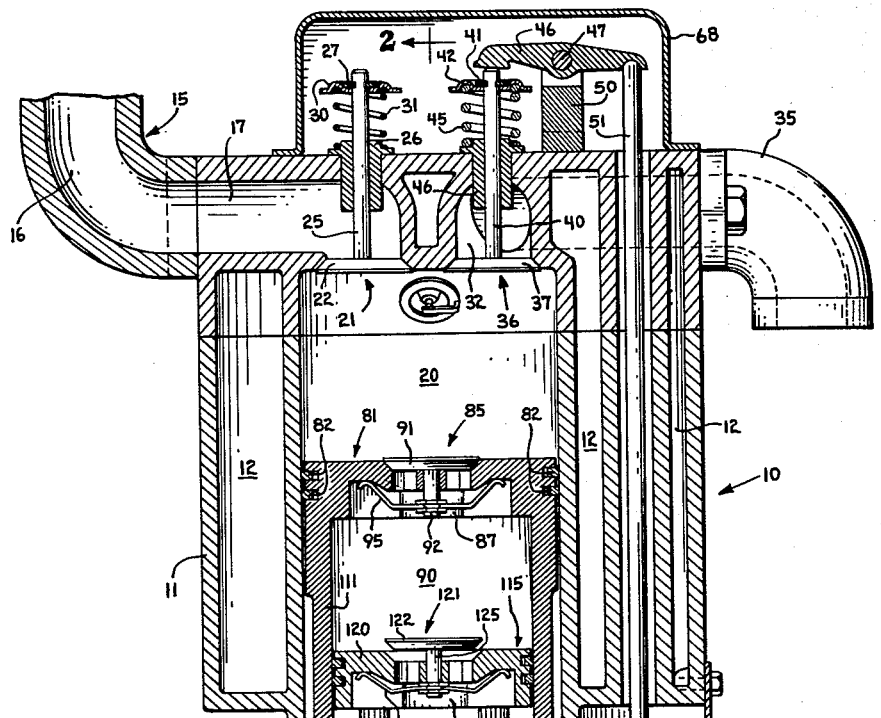
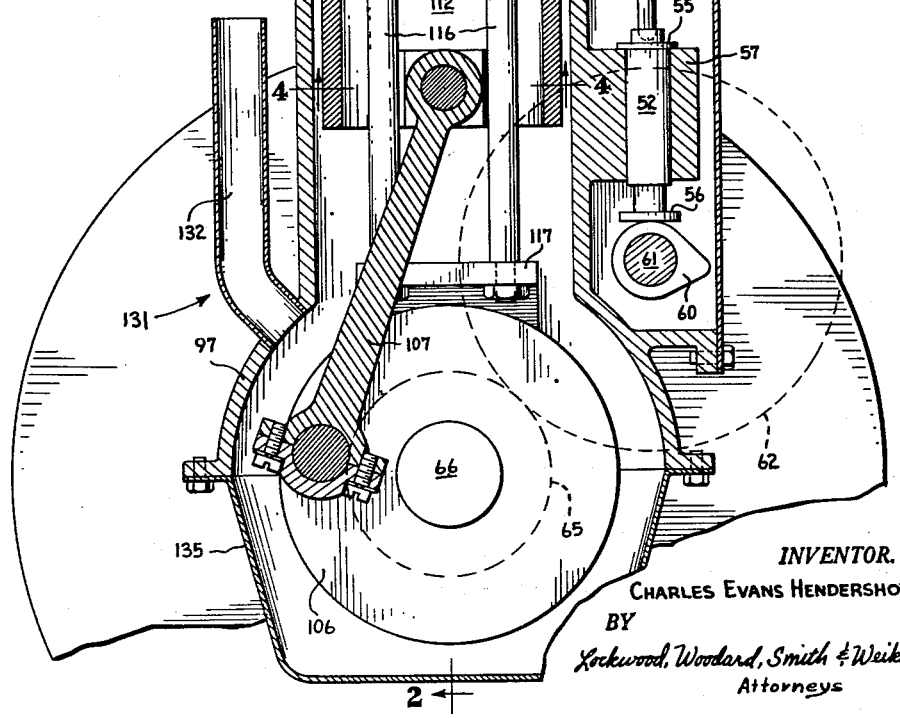
Fig. 1.
INVENTOR.
CHARLES EVANS HENDERSHOT
BY
Lockwood, Woodard, Smith & Weikart
Attorneys

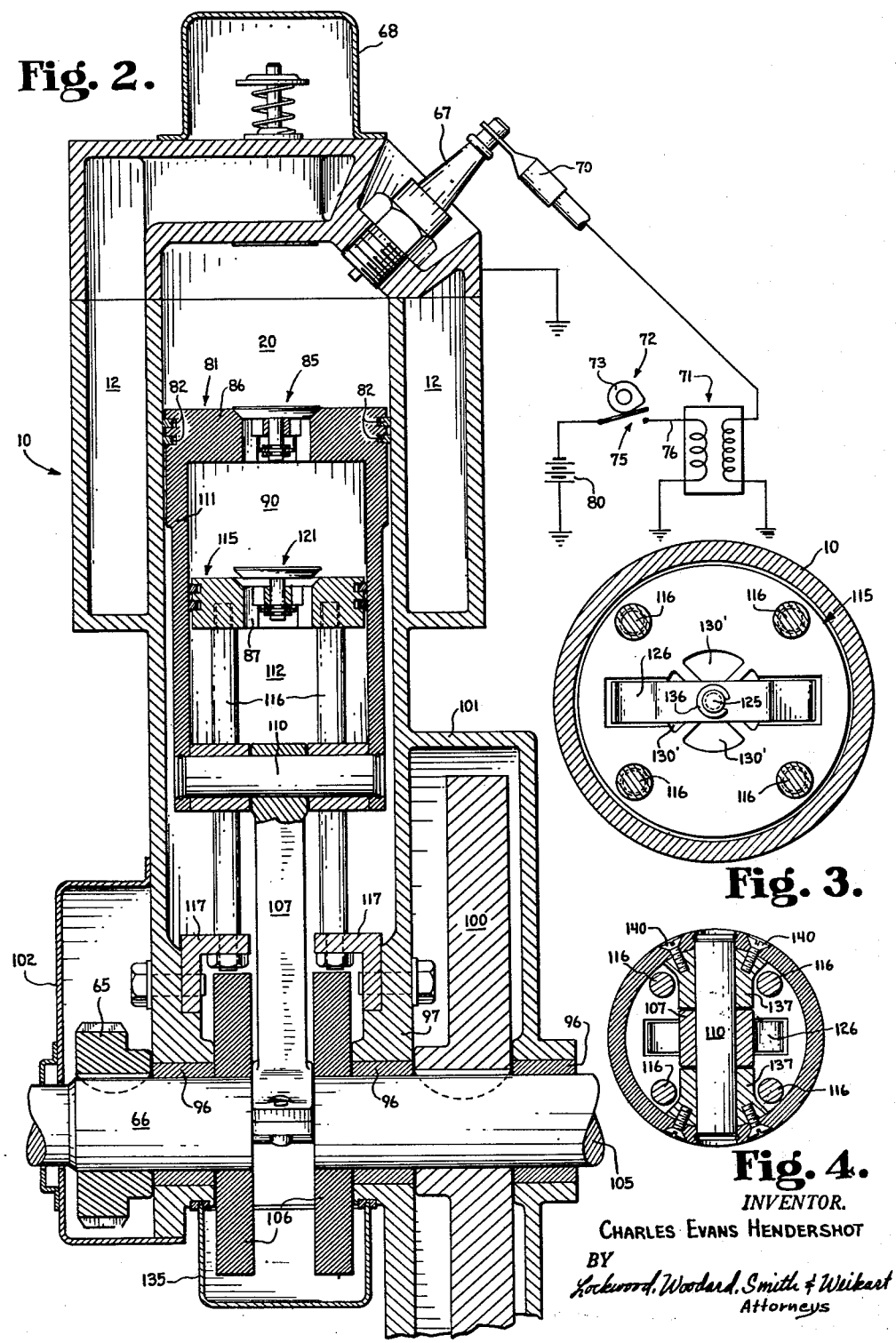

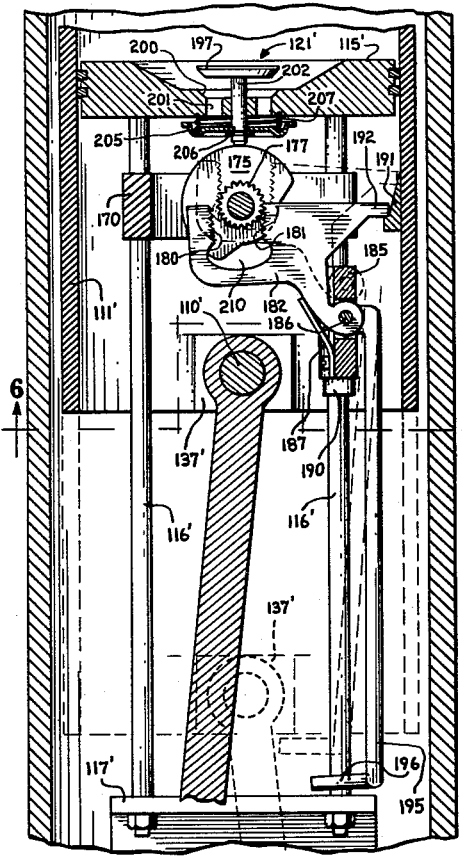

Fig. 7. Fig. 8. Fig. 9. Fig. 10. Fig. 11.
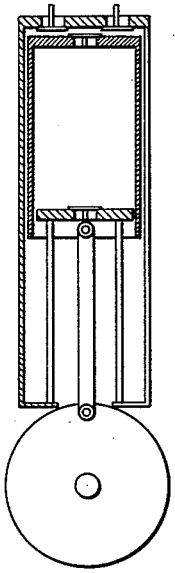 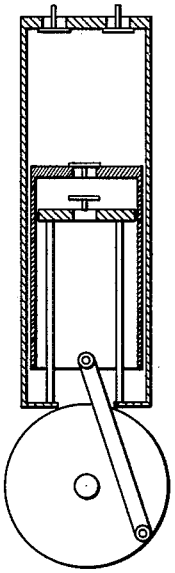 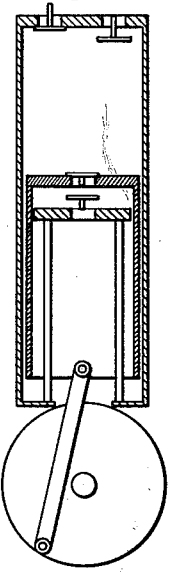 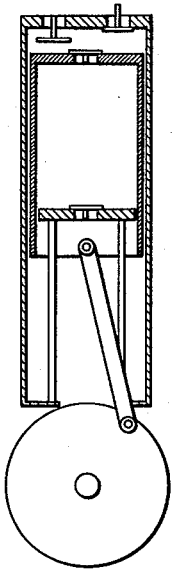 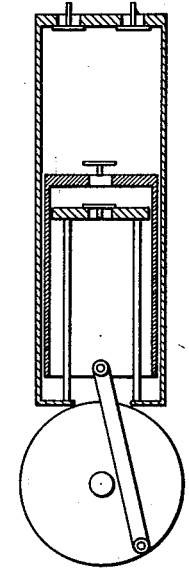
Fig. 12. Fig. 13. Fig. 14. Fig. 15. Fig. 16.
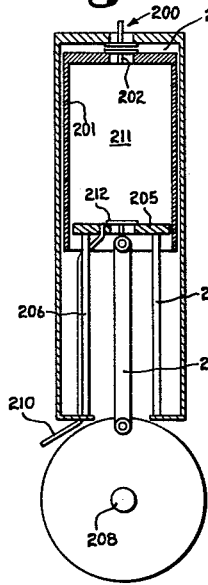 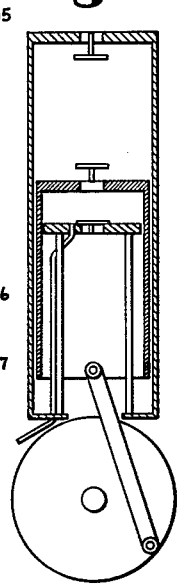 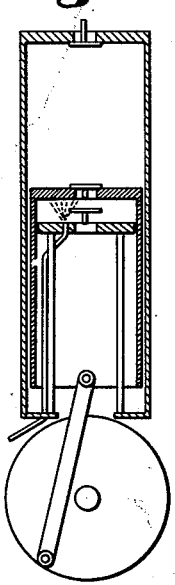 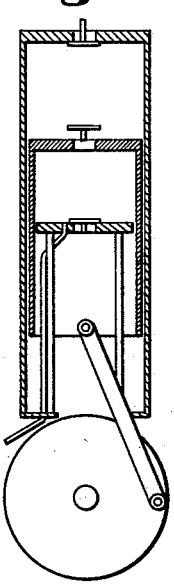 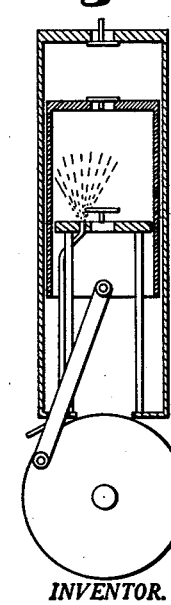
INVENTOR.
CHARLES EVANS HENDERSHOT
BY
Lockwood, Woodard, Smith & Weikart
Attorneys

United States Patent Office 3,177,853
Patented Apr. 13, 1965

3,177,853
INTERNAL COMBUSTION ENGINE ARRANGEMENT
Charles E. Hendershot, Nashville, Ind., assignor, by direct and mesne assignments, of forty-seven percent to Ernest W. Ogle; one percent each to Mitchell T. Preston, Laurent Gredy, Laurence L. Walker, Kenneth D. Schneider, and Max W. Loop, all of Nashville, Ind.; one-half of one percent each to Harold G. Miller, Columbus, Ind., and Robert M. Seibel, Nashville, Ind.
Filed Dec. 28, 1961, Ser. No. 162,809
2 Claims. (Cl. 123—47)

The present invention relates to an internal combustion engine and to a method for reducing the amount of unburned products of combustion exhausted by the engine.

Conventional internal combustion engines for various reasons do not operate at high efficiency. One limiting factor as regards efficiency is the amount of fuel-air mixture which can be placed in the combustion chamber of the engine. In a conventional four cycle engine, this amount is limited to the volume of the combustion chamber when the piston completes its intake stroke. One object of the present invention is to provide an internal combustion engine incorporating means for increasing the amount of fuel and air burned during a combustion stroke.

A further object of the present invention is to provide an internal combustion engine which pumps and burns a greater amount of fuel and air for a given number of strokes of the piston than does a conventional engine whereby efficiency is increased.

Still another object of the present invention is to provide an internal combustion engine capable of greater power for a given number of piston strokes than conventional internal combustion engines.

Present day automobile engines do not completely burn their fuel which results in production of gases and vapors containing unburned fuel and called "blow by." These escaping gases produce "smog" and the like which is a well known problem in such large cities as Los Angeles, California. Approximately one-half of this "blow by" results from gases and vapors escaping past the engine pistons into the oil sump and out the breather tube of the engine. A further object of the present invention is to provide an internal combustion engine incorporating means for eliminating or reducing the escape of "blow by."

Related objects and advantages will become apparent as the description proceeds.

One embodiment of the present invention comprises an internal combustion engine including a cylinder and a movable piston reciprocably received within the cylinder. The movable piston includes a generally cylindrical skirt which receives a stationary piston. There is also provided for the engine a crankshaft and a connecting rod pivoted at one end upon the crankshaft and at the other end upon the skirt of the piston.

The full nature of the invention will be understood from the accompanying drawings and the following description and claims.

FIG. 1 is a vertical section taken along the axis of the cylinder of an internal combustion engine embodying the present invention.

FIG. 2 is a vertical section taken at right angles to the section of FIG. 1 so as to include the axis of the cylinder as well as the axis of the crankshaft of the engine, FIG. 2 being taken along the line 2—2 of FIG. 1 in the direction of the arrows.

FIG. 3 is an enlarged section taken along the line 3—3 of FIG. 1 in the direction of the arrows.

FIG. 4 is a section taken along the line 4—4 of FIG. 1 in the direction of the arrows.

FIG. 5 is a fragmentary section similar to FIG. 1 showing an alternative embodiment of the present invention.

FIG. 6 is a horizontal section taken along the line 6—6 of FIG. 5 in the direction of the arrows.

FIGS. 7–11 are schematic representations of the embodiment illustrated in FIGS. 5 and 6 showing the cycle of operation of that embodiment.

FIGS. 12–16 are schematic representations of a further alternative embodiment of the present invention and show the cycle of operation of that alternative embodiment.

FIG. 17 is a chart showing the cycle of operation of the embodiment of FIGS. 1–4.

FIG. 18 is a chart showing the cycle of operation in the embodiments of FIGS. 5 and 6.

FIG. 19 is a chart showing the cycle of operation of the embodiment illustrated in FIGS. 12–16.

FIG. 20 is a chart showing the cycle of operation of still a further embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, there is illustrated an internal combustion engine including a cylinder 10. This cylinder has integrally formed thereon a water jacket 11 which receives water within its hollow interior 12 whereby the engine is cooled in the conventional manner. An intake manifold 15 is fixed to the top of the cylinder and has an intake passage 16 therethrough which leads into a passage 17 formed in the head of the cylinder. The passage 17 leads into the combustion chamber 20 and is controlled by a check valve 21 including a valve head 22 mounted upon a stem 25 which is reciprocably received within an insert 26 fixed to the cylinder. At the upper end of the valve stem 25, a snap ring 27 acts as a retainer for a spring receiving member 30 against which bears a compression spring 31 which yieldably retains the valve 21 in closed condition. Preferably, the spring 31 is relatively weak so that relatively little pressure drop across the valve is necessary to open the valve.

Also formed in the head of the cylinder is an exhaust passage 32 which leads into an exhaust manifold 35 fixed to the cylinder. The exhaust passage is controlled by a valve 36 including a valve head 37 and a valve stem 40. A snap ring 41 is received on the valve stem and retains spring receiving member 42 beneath which is received compression spring 45 which acts between the insert 46 and the member 42 to yieldably hold the valve 36 in closed condition. Spring 45 is also relatively weak and only sufficiently strong to maintain the valve 36 closed except when the stem is actuated by rocker arm 46.

The rocker arm 46 is pivotally mounted at 47 upon a projection 50 extending upwardly from the head of the cylinder. The rocker arm may be actuated to depress the stem 40 and open the valve through a push rod 51, the lower end of which is fixed to a member 52 having annular flanges 55 and 56 on the opposite ends thereof. These annular flanges limit the vertical movement of the member 52 with regard to a projection 57 which extends from the cylinder and reciprocably receives the member 52.

The lower end of the member 52 rides upon a cam 60 which is fixed to a shaft 61, fixed in turn to a cam shaft gear or timing gear 62. The gear 62 is driven by a smaller gear 65 (FIG. 2) fixed or keyed to the crankshaft 66 of the engine.

A valve cover or housing 68 is removably fixed to the top of the cylinder for protection of the valves 21 and 36. A spark plug 67 is threadedly received within the cylinder in such a manner as to fire the contents of the combustion chamber 20. An electrical lead 70 is connected to the projecting end of the spark plug, said electrical lead being electrically connected to a coil or magneto 71. A cam shaft 72 with cam 73 thereon is driven by the crankshaft of the engine and is arranged to close an electrical switch 75 at appropriate times in order to close the circuit between the low voltage side 76 of the magneto 71 and a source of power 80 whereby the magneto produces a high voltage charge for firing the spark plug 67.

Reciprocally received within the cylinder 10 is a piston 81 provided with conventional piston rings 82 and having a valve 85 mounted in the head 86 thereof. The valve 85 controls an opening 87 through the head 86 which, when open, permits flow of fluid between the combustion chamber 20 and a compression chamber 90. The valve 85 includes a head 91 fixed to a stem 92 which, in turn, is secured to a spring 95 which controls the opening of the valve 85 and permits such opening only when the pressure within the compression chamber 90 exceeds the pressure within the combustion chamber 20 by a predetermined amount.

As mentioned, the engine also includes a crankshaft 66 which is conventionally mounted for rotation within bearings 96 received within the engine block 97 which is formed integrally with the cylinder 10. A conventional flywheel 100 is keyed to the crankshaft 66 and is received within a flywheel housing 101 formed integrally with the engine block. The cam shaft drive gear 65 is received within a housing 102 fixed to one end of the engine block. Power may be taken off from the engine in the conventional manner at the end 105 of the crankshaft.

The crankshaft also includes balance weight members 106 between which is rotatably mounted the connecting rod 107. The connecting rod is pivotally mounted at its upper end to a wrist pin 110, the opposite ends of which are secured to the skirt 111 of the piston 81. It will be noted that the skirt 111 extends a substantial distance downwardly from the head of the piston and also has a cylindrical internal cavity 112 therewithin.

This cylindrical internal cavity together with a stationary piston 115 defines the compression chamber 90. The stationary piston 115 is fixed to four vertical posts 116, the lower ends of which are fixed to angles or brackets 117 which are, in turn, fixed to the engine block. Received within the head 120 of the stationary piston is a check valve 121 which includes a valve head 122 and a valve stem 125. A spring 126 is secured to the valve stem 125 and rides against the lower surface of the head 120 in order to maintain the valve 121 closed except when the pressure below the head is greater than that within the compression chamber 90. In other words, the function of the spring 126 is to maintain the valve in position so that when the pressure within the compression chamber begins to rise, the valve will properly seat within the opening 130 to cut off any possible flow out of the compression chamber through the opening 130.

A breather pipe 131 is fixed to the engine block and by means of its passage 132 permits air to be drawn into the compression chamber 90 through the engine block and the stationary piston.

There is also provided a suitable sump pan 135 fixed to the lower portion of the engine block.

FIG. 3 shows the details of the valve 121 wherein the opening 130 branches into four openings 130'. Also visible in FIG. 3 is the lower surface of the spring 126 and the snap ring 136 that fixes the stem 125 to the spring 126. FIG. 4 shows the details of the wrist pin connection to the skirt of the piston. As can be seen in that figure, the spacer members 137 are fixed to the skirt by screws 140 and function to maintain the connecting rod 107 in a central position upon the wrist pin 110.

Referring to FIG. 17, the cycle of operation of the engine is disclosed. During the power stroke of the engine, the gas and air mixture which has been compressed within the combustion chamber is, of course, fired and causes the piston 85 to be driven downwardly. The line 150 represents the position of the exhaust valve 36 while the lines 151, 152 and 153 represent, respectively, the position of the upper intake valve 21, the position of the lower intake valve 121 and the position of the piston valve 85. From FIG. 17, it will be noted that all of the valves are closed until very near the end of the power stroke. A few degrees before the end of the power stroke, the pressure within the compression chamber 90 becomes sufficiently great to open the valve 85 by overpowering the force of the spring 95. Simultaneously with the opening of the valve 85, the exhaust valve 36 is cammed open so that the blast of air passing from the compression chamber 90 through the opening 87 causes an initial scavenging action. The piston 85 continues downwardly to the bottom of its stroke and begins to move upwardly at which point, the piston valve 121 closes as shown in FIG. 17. The lower intake valve 121, however, opens and stays open until the piston has completed its upward stroke. The cam 60 is so designed as to maintain the exhaust valve 36 open until the upward stroke of the piston is completed. It will be noted that by the initial scavenging action of the gases which were compressed within the compression chamber 90 during the power stroke, and additionally by the exhausting action of the piston during the just mentioned upward stroke, the combustion chamber is thoroughly cleared of all gases burned during the power stroke.

When the piston has reached the upper end of its travel, it will have sucked a charge of air into the compression chamber 90. The cam 60 is so designed so as to permit closure of the exhaust valve 36 when the piston reaches the upper end of the exhaust stroke. The piston then begins to move downwardly whereby the pressure within the combustion chamber is reduced to an extent sufficient to open the valve 21 and to draw in a fuel-air mixture through the intake manifold 15 and passage 17. A conventional carburetor may be mounted upon the intake manifold but should be adjusted so as to provide a very rich mixture for a reason that will become evident. The piston 85 continues its downward stroke until the charge of air within the compression chamber 90 has been compressed to such an extent that the valve 85 is caused to open. This opening occurs near the lower end of travel of the piston but at an earlier point than at the opening of the valve 85 during the power stroke for the reason that the pressure within the combustion chamber 20 is much less during the intake stroke than during the power stroke.

Simultaneously with the opening of the valve 85, the intake valve 21 will close as the pressure increases within the combustion chamber. It can be appreciated that the remainder of the downward stroke of the piston causes a transfer of the air within the compression chamber into the combustion chamber. The result of this transfer is that a fuel-air mixture will be contained within the combustion chamber which is greater in mass than the fuel-air mixture which might be drawn into the combustion chamber as a result of the intake stroke of a conventional four cycle engine.

As shown in FIG. 17, the compression stroke of the piston is carried out with the exhaust valve closed, the upper intake valve closed, the piston valve closed and with the lower intake valve open whereby a new charge of air for scavenging purposes is drawn into the compression chamber. It will be noted that the reason for the carburetor being adjusted to a rich mixture is in order to offset the addition of the charge of air from the compression chamber which occurs during the end of the combined intake and transfer stroke, i.e. from 360 degrees to 540 degrees.

Referring to FIGS. 5 and 6, a further embodiment of the invention is illustrated which is identical to the above described embodiment with the exception that different means are provided for opening the valve 121' in the stationary piston 115'. In the embodiment of FIGS. 5 and 6, the conventional exhaust stroke is used. In other words, an exhaust stroke occupying only 180 degrees of rotation of the crankshaft is used in a similar fashion to conventional four cycle internal combustion engines. As explained above, with regard to the embodiment of FIGS. 1–4, the valve 121 of that embodiment remains closed during the combustion stroke whereby a charge of air is compressed within the compression chamber 90 and this charge of air is used as an initial exhaust scavenging means for thoroughly cleaning out the combustion chamber. In the present embodiment of FIGS. 5 and 6, the valve 121' is held open during the combustion stroke so that no pressure builds up within the compression chamber during the combustion stroke.

Referring to FIG. 18, the positions of the various valves of the embodiment of FIGS. 5 and 6 throughout the complete cycle are disclosed. The line 160 represents the position of the exhaust valve while the lines 161, 162 and 163 represent the positions of the upper intake valve, the lower intake valve 121' and the piston valve. It will be noted that during the combustion stroke, the exhaust valve, the upper intake valve and the piston valve are closed while the lower intake valve 121 is open. During the exhaust stroke from 180 degrees to 360 degrees, the exhaust valve is cammed open, the upper intake valve remains closed because of the pressure within the combustion chamber, and the piston valve remains closed because of the pressure within the combustion chamber all in the manner described above with regard to the first embodiment. Also, during the exhaust stroke, the lower intake valve remains open.

During the third stroke from 360 degrees to 540 degrees, the positions of the valves correspond identically to the positions of the valves of the above described embodiment. Also, during the fourth or compression stroke from 540 degrees to 720 degrees, the positions of the valves correspond identically to the above described embodiment.

Thus, it will be noted that the only difference in operation between the present embodiment and the above described embodiment is that the lower intake valve is maintained open during the power stroke. Since the pressure within the compression chamber 90 would tend to be greater than atmospheric, this valve must be maintained open by some suitable cam means.

Referring to FIGS. 5 and 6, the stationary piston 115' is mounted upon four posts 116' which are, in turn, fixed to angles 117' fixed to the engine block. A C-shaped cam supporting member 170 is fixedly mounted upon the four posts 116' and rotatably mounts the cam shaft 171 which is keyed to a ratchet member 172 which cooperates with ratchet portion 173 integral with the cam supporting member 170. A cam 175 is fixedly mounted upon the cam shaft 171 and is permitted rotation only in a counterclockwise manner as viewed in FIG. 5, a compression spring 176 acting against the cam 175 and the ratchet member 172 to prevent clockwise rotation of the cam.

The cam 175 is rotated through a spur gear 177 fixed upon the cam shaft 171. The spur gear 177 is positioned between a pair of mutually facing racks 180 and 181 integrally formed upon an element 182 pivoted upon a vertically reciprocal member or bar 185 vertically slidable upon two of the posts 116'. The element 182 is pivoted upon the member 185 by means of a pin 186 that extends through a suitable aperture in the member 182 which, itself, is received within a suitable aperture through the vertically slidable bar 185.

A leaf spring 187 is fixed to the bar 185 and engages the member 182 to yieldably hold it in the dotted line position of FIG. 5 wherein the rack 180 is engaging the spur gear 177. A pair of stop members 190 are fixed to two of the shafts 116' in order to limit the downward movement of the bar 185. The skirt 111' of the piston has a cam member 191 fixed to its inside surface and located to engage projecting portion 192 integral with the member 182. The member 182 has a depending rod 195 fixed thereto or integral therewith, said depending rod having an inwardly projecting portion 196 on its lower distal end.

The valve 121' includes a valve head 197 which is engageable with valve seat 200 communicating with the opening or openings 201 extending through the stationary piston 115'. The valve 121' also includes a valve stem 202 which has received thereon a spring retainer 205 and a snap ring 206 which maintains the retainer upon the stem. Between the spring retainer 205 and the stationary piston head is received a compression spring 207 which functions to normally maintain the valve 121' in closed condition except when the valve stem 202 is forced upwardly by the cam 175.

The present cam arrangement is actuated to rotate the cam every 180 degrees rotation of the crankshaft. As shown in FIG. 5 in solid lines, the member 182 is at its lowermost travel and the piston skirt 111' is moving upwardly. Continuing upward movement of the piston skirt causes the cam member 191 to engage the projection 192 and to move the member 182 upwardly. Because the member 182 is pivoted counterclockwise by reason of the cam 191, the rack 181 engages and rotates the spur gear 177 in a counterclockwise direction whereby the cam 175 is rotated. When the piston reaches the uppermost limit of its travel, the rack 181 will have moved past the spur gear 177 which will then be received in the recess 210 in the member 182.

The piston will then begin downward travel which will cause the spring 187 to pivot the member 182 clockwise by reason of the fact that the cam 191 will move away from the member 182. Thus, the member 182 will pivot counterclockwise until the lower portion of the rack 180 will be engaging the spur gear 177. Because of the friction within the apparatus, the member 182 will retain the upper position to which it has been carried by the piston skirt until the piston approaches the lower end of its stroke as shown in dotted lines in FIG. 5. Because the member 182 has been pivoted to a clockwise position as shown in dotted lines, the projecting portion 196 of the rod 195 will be positioned below a respective member 137' fixed to the piston skirt and received about the wrist pin 110'. As the piston moves to the lower end of its travel, it will force the projection 196 downwardly. The downward movement of the member 195 will cause the rack 180 to rotate the cam 175 as the rack moves along the spur gear 177. The spring 187 will insure that the member 182 maintains a clockwise position during downward movement with the rack 180 and spur gear in engagement. Thus, when the piston completes its downward movement and again moves upwardly, the member 182 will be in a downward clockwise position. The above cycle is repeated each 360 degrees rotation of the crankshaft.

It can be seen that the cam 175 will be rotated through a predetermined angle every 180 degrees rotation of the crankshaft. The cam 175 is so formed that its raised portions will maintain the lower intake valve 121' open during the power, exhaust and compression strokes but will permit the valve to close during the third stroke which, as explained above, includes intake, compression of air and transfer of air from the compression chamber into the combustion chamber.

The cycle of FIG. 18 is also shown in FIGS. 7–11. In FIG. 7, the engine is shown at the beginning of the combustion stroke, in FIG. 8 near the end of the combustion stroke, in FIG. 9 just after the beginning of the exhaust stroke, in FIG. 10 just after the beginning of the intake stroke and in FIG. 11 at the beginning of the transfer portion of the third stroke.

Referring to FIGS. 12–16 and FIG. 19, the above described embodiments might be modified to provide for addition of fuel through the stationary piston. In such an alternative embodiment, the above described intake manifold 15, passages 17 and valve 21 would be disposed of and would be replaced by a carburetor communicating with the lower intake valve or alternatively by fuel injection mechanism.

Referring, for example, to FIG. 12, the present alternative embodiment might include an exhaust valve 200 which is cam operated in the manner described above with regard to embodiments of FIGS. 1–6. The movable piston 201 is provided with a check valve 202. The stationary piston 205 is mounted in the manner above described upon posts 206 and a connecting rod 207 operatively connects the piston 201 and the crankshaft 208 as above described. A fuel injection duct 210 is mounted at its distal end upon the stationary piston 205 and is arranged to provide atomized fuel to the compression chamber 211.

Referring to FIG. 19, the cycle of operation of the exhaust valve 200 is indicated by the line 200' while the operation of the fuel injection means 210, the lower intake valve 212, and the piston valve 202 are indicated, respectively, by the lines 210', 212' and 202'. It will be noted from FIG. 19 that the exhaust valve 200 is open during only a small part of the four stroke cycle of the engine. This exhaust valve is operated by cam means similar to that above described. The piston valve 202 is provided with a spring which is relatively weak in comparison to the spring 95 of the above described embodiment. The only function of the spring of the valve 202 is to operate that valve as a check valve and to insure seating of the valve when the pressure within the combustion chamber 215 is greater than the pressure within the compression chamber 211. In all other respects, the engine of FIGS. 12–16 and FIG. 19 is identical in structure with the above described embodiment of FIGS. 1–4.

The cycle of operation of the engine of FIGS. 12–16 is shown in FIG. 19. As illustrated, all of the valves and the fuel injection means are closed during the initial portion of the power stroke. The downward movement of the piston 201 causes compression of the air-fuel mixture within the compression chamber 211. Near the end of the power stroke, the piston valve 202 will open as a result of the greater pressure in the compression chamber. The fluid within the compression chamber will move into the combustion chamber and will scavenge the burned gases within the combustion chamber causing them to move out of the exhaust valve 200 which is cammed open simultaneously with the opening of the piston valve. The piston will continue its downward movement until the zero to 180 degree stroke is completed. As soon as the piston reaches the end of this stroke and again starts upward, the piston valve 202 will close.

The cam operating the exhaust valve 201 is so arranged as to permit the exhaust valve to remain open during the initial portion of the 180–360° stroke to insure substantially complete removal of the burned gases from the combustion chamber. However, after these gases have been substantially removed, the exhaust valve is closed as illustrated in FIG. 19. As the piston starts the second stroke, the lower intake valve is open by reason of the reduced pressure within the compression chamber 211. The fuel injection means is also caused to begin atomizing of fuel into the compression chamber. This addition of fuel and air to the compression chamber continues until the second or 180°–360° stroke is completed. During this stroke, the piston valve remains closed causing compression of the fuel and air charge above the piston. It will be appreciated that at the end of this stroke, the compression chamber contains a full charge of fuel-air mixture and the combustion chamber contains a compressed charge of fuel-air mixture.

Upon reaching the upper end of its second stroke, the piston begins to move downwardly in its third stroke. During the first half of this third stroke, the piston valve 202 will remain closed because the pressure within the combustion chamber will be greater than the pressure within the compression chamber. Since the lower intake valve 212 will close because of the downward movement of the piston, the fuel-air charge within the compression chamber will be compressed. When the piston is approximately halfway through the third stroke, the pressures within the compression and combustion chambers will equalize and the piston valve 202 will open. The second half of the third stroke includes a transfer of the fuel-air mixture from the compression chamber into the combustion chamber. It will be noted that when the piston reaches the lower end of its third stroke, two charges of air-fuel mixture will be received above the piston in the compression chamber.

The piston then moves upwardly in its fourth stroke. During this stroke, the exhaust valve is closed, the fuel injection means is atomizing, the lower intake valve is open, and the piston valve is closed. Thus, a fuel-air mixture will be added to the compression chamber and the double charge of fuel-air mixture within the combustion chamber will be compressed. At the end of the fourth stroke, the charge within the combustion chamber is fired and the cycle is completed.

The cycle of FIG. 19 is shown in FIGS. 12–16. In FIG. 12, the engine is shown at the beginning of the combustion stroke, in FIG. 13 near the end of the combustion stroke, in FIG. 14 just after the beginning of the second stroke, in FIG. 15 near the middle of the third third stroke, and in FIG. 16 near the middle of the fourth stroke.

It should be understood that various cycles can be used to advantage with the structure of the present invention. For example, FIG. 20 shows a six-stroke cycle for use with structure similar to that shown schematically in FIGS. 12–16 and in FIGS. 5 and 6. In FIG. 20, the line 300 represents the exhaust valve while the lines 301, 302 and 303 represent the fuel injection means, the lower intake valve and the piston valve, respectively. As illustrated, the exhaust valve, the fuel injection means and the piston valve are all closed and the lower intake valve is open during the complete power stroke. In order to maintain the lower intake valve open, it will be necessary to provide means such as illustrated in FIGS. 5 and 6. The second stroke of the piston causes exhaust of the products of combustion as well as intake of fuel and air into the compression chamber. During this stroke, the exhaust valve and lower intake valve are open, the piston valve is closed and the fuel injection means is operating whereby the products of combustion are exhausted and a fuel-air charge is drawn into the compression chamber.

During the third stroke of the piston, the exhaust valve and lower intake valve are closed, the piston valve is open and the fuel injection means is not operating. Thus, this third stroke consists entirely of a transfer of the fuel-air charge in the compression chamber into the combustion chamber. During the fourth stroke of the piston, the exhaust valve and piston valve are closed, the lower intake valve is open and the fuel injection means is operating. Thus, this fourth stroke causes simultaneous compression of the charge in the combustion chamber and intake of a new fuel-air charge into the compression chamber.

The fifth stroke of the engine operates to transfer the charge within the compression chamber into the combustion chamber. During this stroke, the exhaust valve and the lower intake valve are closed and the fuel injection means is closed. During the first half of this stroke, the piston valve is also closed because the pressure within the combustion chamber is greater than the pressure within the compression chamber. In approximately the middle of this stroke, the piston valve opens so that the remainder of the stroke consists of a transfer of the charge within the compression chamber into the combustion chamber.

During the sixth stroke of the piston, the exhaust valve and piston valve are closed, the fuel injection means is not operating and the lower intake valve is open. The function of this stroke is to compress the charge within the combustion chamber for firing at the end of the stroke. The fuel injection means is not operating because the fluid within the compression chamber at the end of this stroke is not used but instead is exhausted through the lower intake valve during the power stroke. It can be appreciated that the immediately above described cycle makes possible the provision to the combustion chamber of two complete charges of air-fuel mixture and does this in a six-stroke cycle.

From the above description, it will be obvious that the present invention provides an internal combustion engine which pumps and burns a greater amount of fuel and air for a given number of strokes of the piston than does a conventional engine whereby power is increased. It should also be clear that by means of the present invention, a given sized engine can be greatly increased in power. Furthermore, the present invention provides an internal combustion engine incorporating means for increasing the amount of fuel and air burned during a combustion stroke.

As mentioned above, one of the objects of this engine is to reduce or eliminate "blow by." This is accomplished by reason of the fact that in all described embodiments of the engine, the valve in the stationary piston operates in such a manner that fluid is pumped into the compression chamber through the crankcase and breather. Thus, a continuous suction is maintained upon the breather 131 which prevents vapor from being exhausted though the breather. In other words, the sum total of all cycles of the engine of the present invention is a movement of air into the crankcase through the breather so that "blow by" exhausting through the breather is eliminated.

While the invention has been illustrated and described in detail in the drawings and forgoing description, the same is to be considered as illustrative and not restrictive in character, it being understood that only the preferred embodiments have been shown and described and that all changes and modifications that come within the spirit of the invention and the scope of the claims are also desired to be protected. For example, the diesel operation without spark plug might be used with the structure and cycles of the present invention.

The invention claimed is:

1. An internal combustion engine comprising a cylinder; a movable piston reciprocably received within the cylinder and including a head and a generally cylindrical skirt; a stationary piston received within said skirt, said stationary piston and movable piston defining therebetween a compression chamber and said cylinder and movable piston defining therebetween a combustion chamber; a crankshaft; a connecting rod connecting the movable piston and the crankshaft; a valve mounted in said stationary piston so as to control air flow between atmosphere and said compression chamber; and a check valve mounted within the head of said movable piston so as to permit fluid flow from said compression chamber into said combustion chamber but prevent fluid flow from said combustion chamber into said compression chamber; said piston being movable through a four stroke cycle including a combustion first stroke, an exhaust second stroke, a third stroke and a compression fourth stroke; an inlet check valve mounted within the wall of said cylinder so as to permit fluid flow into said combustion chamber but prevent fluid flow out of said combustion chamber; an intake manifold communicating with said inlet check valve, means for providing a rich fuel-air mixture to said intake manifold, and means for opening said stationary piston intake valve during said combustion, exhaust and compression strokes and for closing said stationary piston intake valve during said third stroke.

2. An internal combustion engine comprising a cylinder; a movable piston reciprocably received within the cylinder and including a head and a generally cylindrical skirt; a stationary piston received within said skirt, said stationary piston and movable piston defining therebetween a compression chamber and said cylinder and movable piston defining therebetween a combustion chamber; a crankshaft; a connecting rod connecting the movable piston and the crankshaft; a valve mounted in said stationary piston so as to control air flow between atmosphere and said compression chamber; and a check valve mounted within the head of said movable piston so as to permit fluid flow from said compression chamber into said combustion chamber but prevent fluid flow from said combustion chamber into said compression chamber; said piston being movable through a six stroke cycle including a combustion first stroke, an exhaust and intake second stroke, a transfer third stroke, a compression and intake fourth stroke, a transfer fifth stroke, and a compression sixth stroke, an exhaust valve mounted in the wall of said cylinder and controlling fluid flow from said combustion chamber; means for opening said stationary piston intake valve during said combustion; exhaust and compression strokes and for closing said stationary piston intake valve during said transfer strokes, and means for opening said exhaust valve during said exhaust stroke and for otherwise maintaining said exhaust valve closed.

References Cited by the Examiner
UNITED STATES PATENTS

| | | | |
|---|---|---|---|
| 882,812 | 3/08 | Carlson | 123—76 |
| 980,110 | 12/10 | Maud | 123—47 |
| 1,193,367 | 8/16 | Derr | 123—47 |
| 1,469,319 | 10/23 | Kershaw | 123—74 |
| 1,542,463 | 6/25 | Lyreman et al. | 123—74 |
| 1,606,479 | 11/26 | Midgley | 123—76 |
| 1,900,200 | 3/33 | Poyer | 123—75 |
| 2,082,078 | 6/37 | Ottoson | 123—47 |
| 2,188,630 | 1/40 | Graham | 123—74 |
| 2,319,427 | 5/43 | Morgan | 123—56 |
| 2,327,565 | 8/43 | Sherwood | 123—75 |

FRED E. ENGELTHALER, *Primary Examiner.*